United States Patent Office 3,414,560
Patented Dec. 3, 1968

3,414,560
POLYFUNCTIONAL LEVOGLUCOSAN ETHERS
Lawrence G. Carlberg, Tacoma, Wash., and Fraidoun Shafizadeh, Missoula, Mont., assignors to Weyerhaeuser Company, Tacoma, Wash., a corporation of Washington
No Drawing. Filed Dec. 6, 1966, Ser. No. 599,368
4 Claims. (Cl. 260—209)

ABSTRACT OF THE DISCLOSURE

Allyl ether derivatives of levoglucosan made by reacting levoglucosan with an allyl halide are useful intermediates in the production of polyfunctional epoxide resins made by reaction of the allyl ether derivative with an epoxidizing agent. Specific compounds are triallyl levoglucosan and triglycidyl levoglucosan.

This invention relates to a new composition of matter. More specifically, this invention relates to a new composition of matter produced by reacting levoglucosan and an allyl halide to produce a polyallyl ether derivative which can be further reacted with an epoxidizing agent to produce a polyfunctional epoxide resin.

A variety of carbohydrate compounds are derived from wood and wood waste products. Large-scale industrial applications of these carbohydrate compounds could form the basis for a substantial wood waste industry. One of these compounds is levoglucosan. Levoglucosan may be derived from sawdust by pyrolysis and has the following formula:

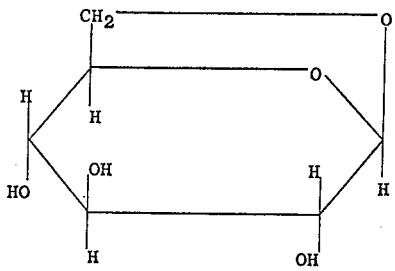

As can be seen from the above formula, there are three reactive hydroxyl groups. It has been discovered that levoglucosan can be converted to a useful polyallyl ether derivative by reacting the levoglucosan and a suitable allyl halide. The allyl halide will react with the three hydroxyl groups to produce the polyallyl ether derivative. The allyl halide may be selected from the group consisting of allyl chloride, allyl bromide, allyl iodide and mixtures thereof. The amount of allyl halide added to the levoglucosan to react therewith may range up to one mole of the allyl halide per hydroxyl group of the levoglucosan. Accordingly, when one mole of allyl halide per hydroxyl group of the levoglucosan is used, the reaction product will provide the following compound illustrated by the following formula:

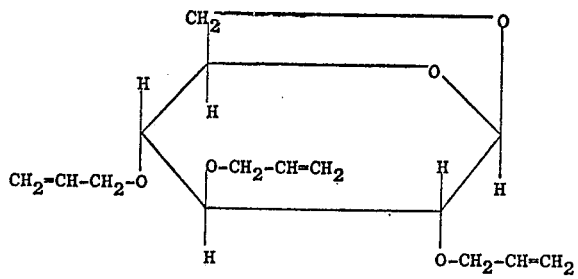

After levoglucosan has been converted to a polyallyl ether derivative as noted above, the resulting reaction product may be used in forming polyfunctional epoxy resins. Also, this intermediate product can be used as a modifier in resin polymers because of the presence of the double bonds within the molecular structure. The properties of the resulting epoxy resin will depend largely upon the amount of allyl halide that is used. Accordingly, if the number of moles of the allyl halide approaches one mole per hydroxyl group in the levoglucosan as illustrated above, the resulting product, triallyl levoglucosan, will have three allyl groups coupled to the levoglucosan nucleus. When this product is reacted with a conventional epoxidizing agent the resulting product will have three epoxide functional groups. The epoxidizing agents employed with the present invention may be selected from a number of aliphatic or aromatic peracids such as m-chloroperbenzoic acid, performic acid, peracetic acid, perbenzoic acid, perphthalic acid, trifluoroperacetic acid. Thus the reaction of the triallyl levoglucosan with an epoxidizing agent will result in triglycidyl levoglucosan which is indicated by the following formula:

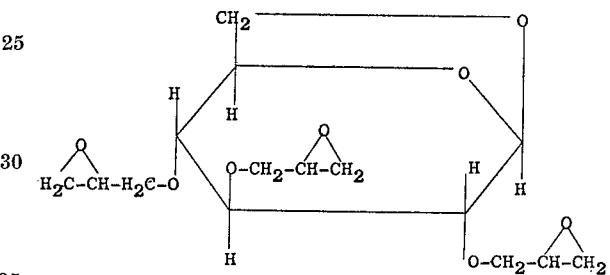

The above trifunctional epoxide confers superior properties to the cured epoxy polymer due to the crosslinking with the three epoxy functional groups.

The reaction between the levoglucosan and the allyl halide is preferably promoted by dissolving the levoglucosan in a strong basic solution such as sodium hydroxide and then adding the allyl halide. The initial reaction temperature may be up to the boiling point temperature of the allyl halide but preferably is around 80° C. The reaction solution can be further heated in a pressure vessel, if desired, for up to about eight hours, cooled and then water is added. This will provide an upper organic layer and a lower aqueous layer. The upper organic layer contains the product while the lower aqueous layer contains by-product sodium hydroxide, sodium halide, etc. The upper layer is then separated, steam distilled and the residue dissolved in methyl ethyl ketone. The solution can then be washed, dried, filtered and concentrated and then dissolved in acetone, dried again and then concentrated to a constant weight.

The reaction product, allyl levoglucosan, can then be epoxidized by adding the allyl levoglucosan to an epoxidizing agent, as noted above, which has been dissolved in a solvent carrier such as chloroform, and then allowed to epoxidize under refrigeration. The product, triglycidyl levoglucosan, is then washed with water, dried over anhydrous sodium sulfate, concentrated, and then redissolved in a solvent such as methyl ethyl ketone, dried, and reconcentrated to a constant weight.

The triglycidyl levoglucosan can now be readily used as a coating material and cured to a finally cured polymer by adding thereto a polyamine such as triethylenetetraamine, or intermixed with a polyamide resin which is conventional in the art. It should be noted that when a polyamide hardening agent is used with the triglycidyl levoglucosan, a weight ratio of from 1.5:7 to 3.0:7 should be used. However, when an amine compound is used as a hardening agent for the triglycidyl levoglucosan epoxy resin, the ratios should be 0.5:7 to 1.5:7.

In order to further illustrate the merits of the present invention, the following examples are given:

EXAMPLE I

A solution of 32.4 grams of levoglucosan was dissolved in 66.2 grams of a 50% sodium hydroxide solution. Then, 100 grams of allyl bromide was added dropwise at 70° C. The reaction was then heated to 80° C. for an additional three hours, cooled and 100 ml. of water added. The upper organic layer was separated, steam distilled and the residue dissolved in methyl ethyl ketone. This solution was then washed with water, dried over anhydrous sodium sulfate, filtered, concentrated, dissolved in acetone, dried with additional sodium sulfate, and finally concentrated to a constant weight of 31.05 grams. The theoretical yield of the allyl levoglucosan was determined to be 56%.

EXAMPLE II

An 8.5 gram sample of the allyl levoglucosan of Example I was mixed with 20 grams of 85% m-chloroperbenzoic acid in 250 ml. of chloroform and allowed to epoxidize for about 65 hours under refrigeration. The precipitate of m-chlorobenzoic acid was filtered off and the filtrate was washed with a saturated soluton of sodium bicarbonate to remove excess reagent. The product solution was then washed with water, dried over anhydrous sodium sulfate, concentrated, redissolved in methyl ethyl ketone, dried and reconcentrated to a constant weight. The reaction product was analyzed and was found to contain 8.23 meq. epoxy per gram of the sample.

While various specific examples of preferred procedure embodying the above invention have been described above, it will be apparent that many changes and modifications may be made in those methods of procedure without departing from the spirit of the invention. It should, therefore, be understood that the examples cited and the methods of procedure set forth above are intended to be illustrative only and are not intended to limit the scope of the invention.

What is claimed is:
1. Triallyl levoglucosan.
2. Triglycidyl levoglucosan.
3. An allyl ether derivative of levoglucosan having the formula

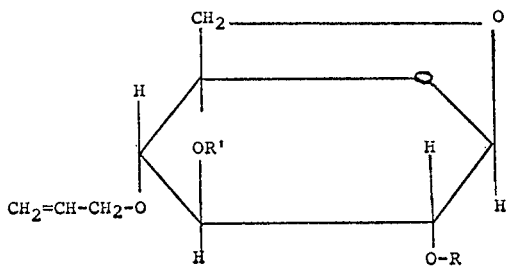

where R and R' are hydrogen or $-CH_2-CH=CH_2$.

4. An epoxide compound having the formula

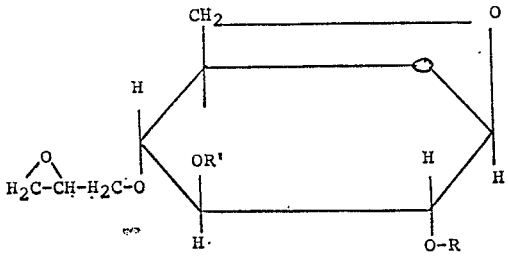

where R and R' are hydrogen or

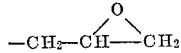

References Cited

UNITED STATES PATENTS

| | | | |
|---|---|---|---|
| 3,208,993 | 9/1965 | Fischer et al. | 260—209 |
| 3,235,541 | 2/1966 | Carlson | 260—209 |
| 3,340,239 | 9/1967 | Schweiger | 260—209 |

LEWIS GOTTS, *Primary Examiner.*

J. R. BROWN, *Assistant Examiner.*